US 8,954,246 B2

(12) United States Patent
Siegel et al.

(10) Patent No.: US 8,954,246 B2
(45) Date of Patent: Feb. 10, 2015

(54) GRADE AND PAYLOAD ESTIMATE-BASED TRANSMISSION GEAR SELECTION

(71) Applicant: Caterpillar Inc., Peoria, IL (US)

(72) Inventors: Bryan T. Siegel, Brimfield, IL (US); Evan E. Jacobson, Edwards, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 13/715,106

(22) Filed: Dec. 14, 2012

(65) Prior Publication Data
US 2014/0172252 A1  Jun. 19, 2014

(51) Int. Cl.
*G06F 7/00* (2006.01)
*F16H 61/00* (2006.01)

(52) U.S. Cl.
CPC ..................................... *F16H 61/00* (2013.01)
USPC .......................................................... 701/55

(58) Field of Classification Search
CPC ............................. B60W 10/06; B60W 20/00
USPC .......................................................... 701/55
See application file for complete search history.

(56) References Cited

U.S. PATENT DOCUMENTS

| | | | |
|---|---|---|---|
| 4,414,863 A | 11/1983 | Heino | |
| 4,953,093 A | 8/1990 | Etoh | |
| 5,172,609 A | 12/1992 | Nitz et al. | |
| 5,317,937 A | 6/1994 | Yoshizawa et al. | |
| 5,434,780 A | 7/1995 | Kume et al. | |
| 5,685,799 A | 11/1997 | Vukovich et al. | |
| 6,029,107 A | 2/2000 | Sato | |
| 6,044,317 A | 3/2000 | Taffin | |
| 6,106,434 A | 8/2000 | Ibamoto et al. | |
| 6,295,498 B1 | 9/2001 | Gleason et al. | |
| 7,090,616 B2 | 8/2006 | Henneken et al. | |
| RE39,684 E | 6/2007 | Ohnishi et al. | |
| 7,499,784 B2 | 3/2009 | Kresse | |

(Continued)

FOREIGN PATENT DOCUMENTS

| | | |
|---|---|---|
| EP | 0512596 A1 | 11/1992 |
| JP | 2002013625 | 1/2002 |
| JP | 2008201401 | 9/2008 |

OTHER PUBLICATIONS

Vahidi et al., "Recursive Least Squares with Forgetting for Online Estimation of Vehicle Mass and Road Grade: Theory and Experiments," *Vehicle System Dynamics*, vol. 43, No. 1, 2005, pp. 31-55.

*Primary Examiner* — James Trammell
*Assistant Examiner* — Michael D Lang
(74) *Attorney, Agent, or Firm* — Leydig, Voit & Mayer, Ltd.

(57) ABSTRACT

A vehicle includes an automatic transmission and a set of sensor inputs providing values indicating a current operational status of the vehicle pertinent to controlling the automatic transmission. The set of sensor inputs include: engine speed, engine torque, current transmission gear; and vehicle speed. The vehicle includes a programmed processor configured to iteratively and co-dependently generate a vehicle mass parameter value and a grade of incline parameter value. The programmed processor, when generating the vehicle mass parameter value and the grade of incline parameter value, uses a set of parameters including: a propulsive force driving the vehicle; a set of forces acting on the vehicle resisting forward movement, and an observed rate of change of a speed of the vehicle.

16 Claims, 5 Drawing Sheets

(56) References Cited

U.S. PATENT DOCUMENTS 7,899,584 B2  3/2011  Schricker
2008/0249693 A1* 10/2008 Kresse ............................ 701/61
2009/0093936 A1* 4/2009 Lindgren et al. ................ 701/55
2010/0318267 A1 12/2010 Murata et al.

* cited by examiner

GRADE AND PAYLOAD ESTIMATE-BASED TRANSMISSION GEAR SELECTION

TECHNICAL FIELD

This disclosure relates generally to controlling transmission gear selection in heavy machinery, such as articulated trucks, having automatic transmissions. More particularly, the present disclosure relates to heavy machines including automatic transmissions that are controlled according to a selected one of multiple pre-defined transmission gear selection schedules. The gear selection schedule is selected based upon observed conditions indicative of power demand. Such conditions include both operator demand (e.g., throttle position) and machine load (e.g., machine weight, grade of traveled surface, etc.).

BACKGROUND

Wheel-driven heavy machinery, such as articulated trucks and graders/scrapers, operate under a wide variety of conditions that require different amounts of driving force (i.e., torque) to be produced by an output of a drive train to propel the machinery. Such conditions include surface types, grades, and cargo payload conditions. Moreover, a vehicle drive train control takes into consideration the expectations of a human operator, as indicated for example by a current throttle position. Thus, at least one important aspect of the vehicle drive train control is to take into consideration current operating conditions and driver demand and render responsive vehicle drive train control commands (e.g., increase fuel/air flow, reduce/increase transmission gear ratio, etc.).

A transmission gear/shift selection control method is described in Kresse U.S. Pat. No. 7,499,784. A shift schedule is selected for a transmission on an open-road (e.g., semi-trailer) truck based upon sensed conditions. In particular, the shift schedule is selected based upon a vehicle mass and an estimated road grade. In the example, a road grade estimate is calculated based upon a current vehicle mass (including payload) and tractive effort by the drive train. The net force causing acceleration of a truck is determined by subtracting a variety of forces (braking, drag, and grade) from the torque generated by the drive train upon the wheels. A recursive least squares estimator with forgetting facilitates generating a first estimate of road grade from the aforementioned parameter values. A second grade estimate provides an alternative grade value when poor signal-to-noise ratio conditions are detected. The vehicle mass estimate and a grade estimate, provided by one of the two alternative grade estimate sources, provide inputs to a transmission control that switches between performance (high power) and economy (high mileage) modes.

Nitz EP App. Pub. No. 0 512 596 A1 describes a shift pattern control in which upshifting/downshifting is modified in response to changes in road load. Above normal road load conditions can occur when a vehicle is towing a trailer, traveling a steep grade, and/or when unusual aerodynamic loading is encountered. When excessive road load is detected a shift pattern is adopted characterized by earlier downshifting during deceleration and later upshifting during acceleration of a vehicle traveling under above normal road load conditions.

Shortcomings in the state of the art are addressed by aspects of an exemplary method and transmission assembly (including a controller thereof) described herein.

SUMMARY OF THE INVENTION

A vehicle and method carried out by such vehicle are described herein. The vehicle includes an automatic transmission and a set of sensor inputs providing values indicating a current operational status of the vehicle and pertinent to controlling the automatic transmission. The set of sensor inputs include: engine speed, engine torque, current transmission gear; and vehicle speed. The vehicle furthermore includes a programmed processor configured by computer-executable instructions to iteratively and co-dependently generate a vehicle mass parameter value and a grade of incline parameter value. The programmed processor, when generating the vehicle mass parameter value and the grade of incline parameter value, uses a set of parameters including: a propulsive force driving the vehicle; a set of forces acting on the vehicle resisting forward movement, and an observed rate of change of a speed of the vehicle. The invention is furthermore embodied in a method carried out by a vehicle embodying the above functionality and a non-transitory computer readable medium including computer-executable instructions for execution by a processor/controller to carry out the above-described functionality.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
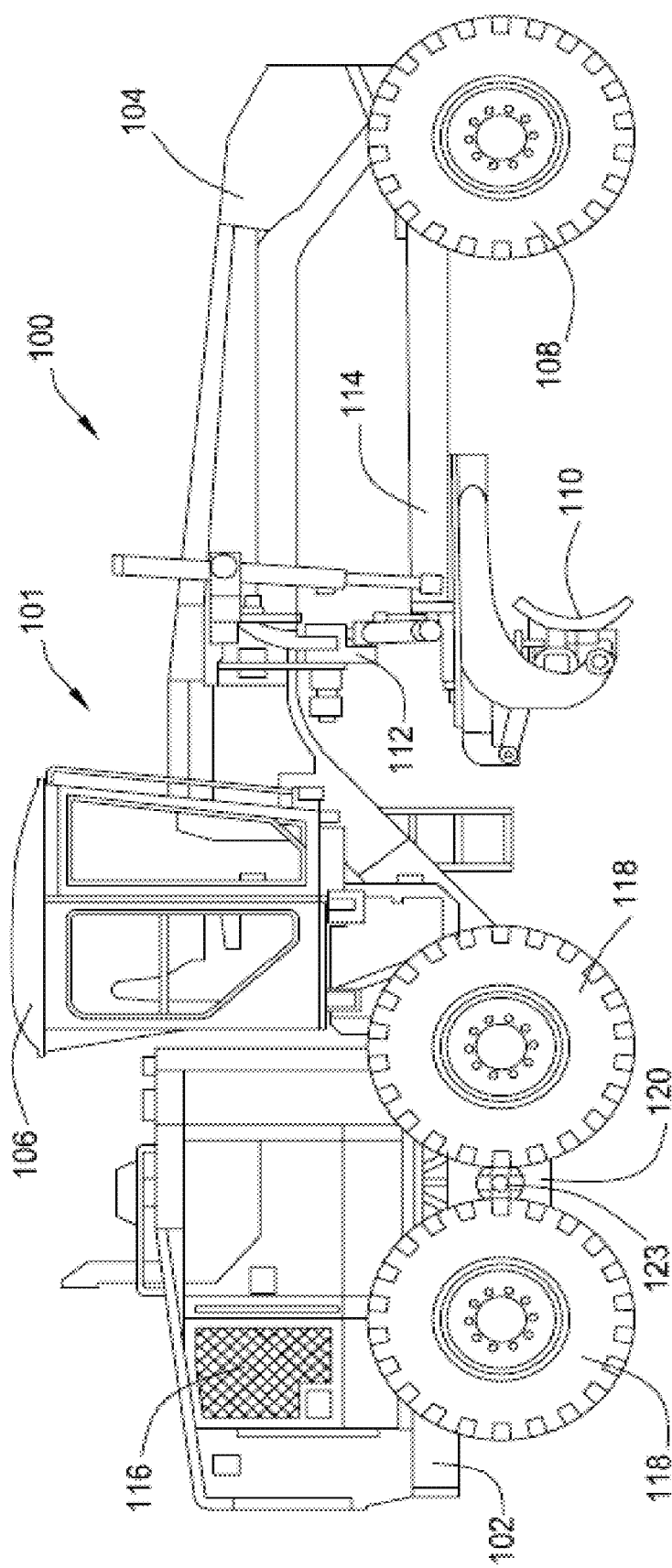
FIG. 1 is an outline view of a motor grader machine/vehicle, which is illustrated as one example of a machine suitable for incorporating a load/grade estimator and gear selection strategy in accordance with the disclosure.

Before turning to the drawings, it is generally noted that this disclosure relates to vehicles including automatic transmissions governed by a programmed controller to facilitate managing a gear selection (shift point) strategy based in part upon a power train performance parameter (e.g., power curve, torque curve, etc.), a payload estimate, and a grade estimate. The payload and grade estimates are generated from a determination of the forces potentially acting upon a vehicle in motion. Based upon the calculated payload and grade estimates, the controller selectively triggers a shift control schedule from a set of pre-configured shift control schedules for the vehicle. For example, where a total resistive force exceeding the current propulsive force of the vehicle (at a currently selected gear) is encountered, a high output gear shift control schedule is triggered. The high output gear shift control schedule, characterized by an early downshift during vehicle linear deceleration, maintains the drive train at a high (power and/or torque) output while downshifting during deceleration of the machine due to encountering high resistance to movement in the current direction of travel of the vehicle. In the illustrative example, the downshift control schedule is implemented to maintain high power delivery as measured at a drive wheel/traveled surface interface—referred to herein as "rim power" (power exerted by the wheel outer edge/rim to propel a vehicle along a surface).

Encountering high resistance to vehicle movement along a traveled surface can be attributed to a variety of sources including: carrying a heavy load, travelling a steep incline, implement/tool (e.g., grader blade) resistance, etc. The system and method described herein take into consideration multiple, potentially varying, sources of resistance to vehicle movement to determine, for example, an appropriate gear shift schedule such as determining whether to trigger an early downshift schedule for the automatic transmission, thus maintaining the output of the drive train at or near a maximum during a series of gear changes.

The transmission control strategy, implemented by the programmed controller, described herein includes two generalized functions. A first function determines a final gear based upon a current determination of power train output torque, measured at the wheel/ground interface, needed to counter a current resistance to forward movement. By way of example, such resistance is a function of a measured grade that the vehicle is currently attempting to climb and a current vehicle mass. The measured grade is provided, for example, by an inertial measurement unit. The vehicle mass is determined by any of a variety of methods, including determinations based upon machine characteristics and physics-based calculations (e.g. force=(mass)*(acceleration)).

A second function, of the two generalized functions, selects an appropriate downshift schedule based upon the final gear provided by the first function and a combination of factors including: a throttle position, a load status, a machine acceleration, and a current gear. The combination of the first and second module functionalities facilitates consistent gear shift behavior while traversing a series of downshifts necessitated by encountering a high resistance to the propulsive force provided by a machine transmission.

Having briefly summarized the general functionality of an illustrative payload and grade estimator used to trigger a performance gear shift strategy to facilitate operating at maximum rim power during a period of deceleration while climbing a steep grade, attention is directed to FIG. 1 that provides an outline perspective view of one example of a machine 100 incorporating such control scheme. In the illustration of FIG. 1, the machine 100 is a motor grader, which is one example for a machine to illustrate the concepts of the described payload and grade estimator, the output of which is used by a programmed controller for an automatic transmission to trigger a performance based gear selection strategy. While the arrangement is illustrated in connection with the motor grader, the arrangement described herein has potential applicability in various other types of machines, such as wheel loaders, articulated trucks, etc. The term "machine" refers to any machine that performs some type of operation associated with an industry such as mining, construction, farming, transportation, or any other industry known in the art. For example, the machine may be a dump truck, backhoe, grader, material handler or the like.

A motor grader is used in the description that follows as an example for illustration. A side view of a machine 100, in this example a motor grader 101, is shown in FIG. 1. The motor grader 101, a machine having a hydrostatically operated propel circuit for moving the machine across the terrain and a hydraulically operated implement circuit operating an implement for performing various machine tasks, is described herein for the sake of illustration. However, any other mode of powering the machine is contemplated, for example, by use of electrically operated motors and/or actuators. For instance, an alternative embodiment for the machine 100 may include a generator or another device capable of producing an alternative form of energy, such as electrical power.

The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. In the illustrative example the implement, a blade 110, is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1 as 112, while support for the loading experienced by the blade 110 during operation is accomplished by a bar 114, which pivotally connects the implement portion 104 to the blade 110.

The engine frame 102 supports an engine (not visible), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith.

In a hydrostatically operated machine, the engine in the engine frame 102 may be associated with a hydrostatic pump (not shown), which may be part of a hydraulic system operating a propel system of the motor grader 101. In the embodiment shown, the motor grader 101 is driven by two sets of drive wheels 118 (only one set visible), with each set including two drive wheels 118 that are arranged in a tandem configuration along a beam 120. Two beams, one being the beam 120, are pivotally connected on the ends of a shaft or axle at a respective pivot joint or bearing 123, with the beam 120, of the two beams, disposed on one side of the motor grader 101.

At least one or both of the two drive wheels 118 on the beam 120 may be actively rotated or driven by a corresponding motor. When only one wheel of the two drive wheels 118 is powered, the other wheel may be idle or, stated differently, may be free to rotate relative to the beam 120.

Figure 2:
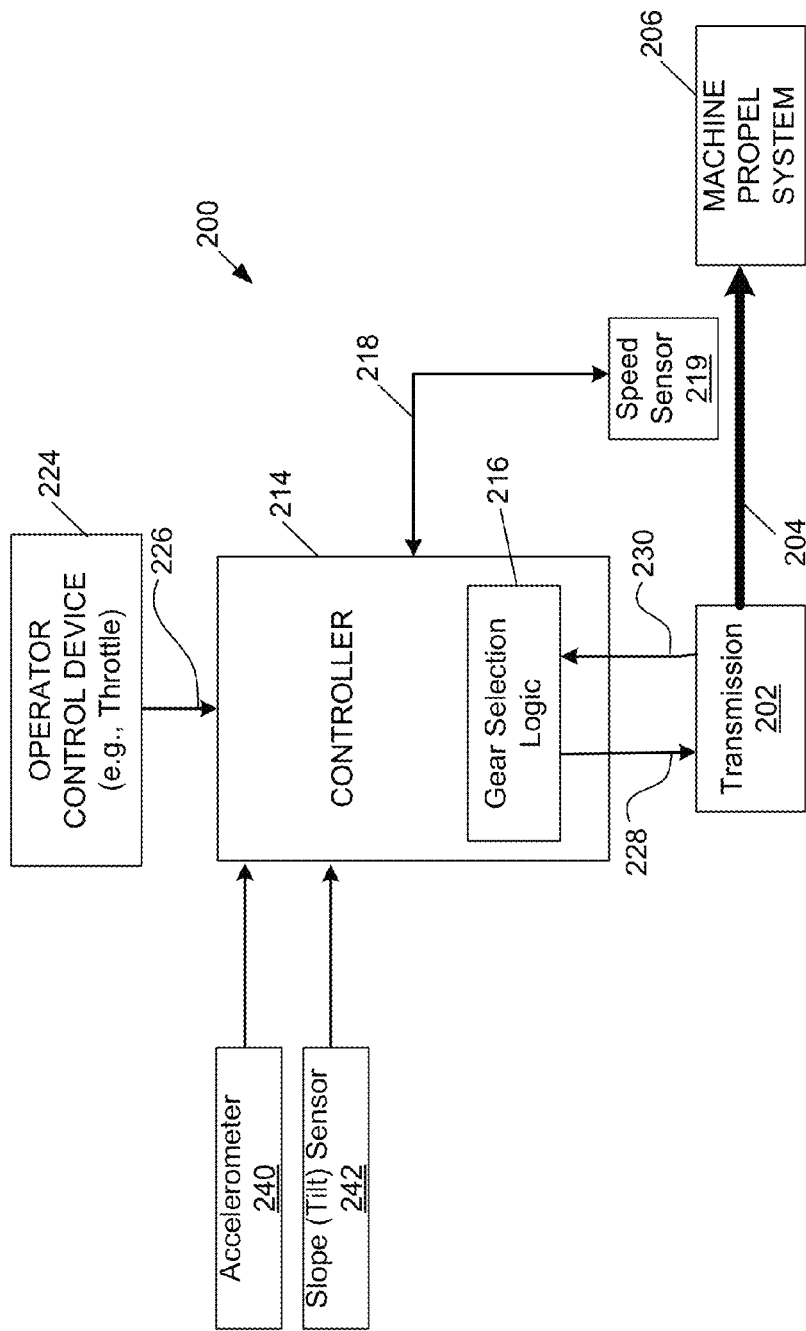
FIG. 2 is a block diagram representation of a programmed controller, automatic transmission and related components for an exemplary machine in accordance with the disclosure.

A simplified block diagram of a power delivery system 200 for a machine including an automatic transmission, for example, the machine 100 (FIG. 1), is shown in FIG. 2. The power delivery system 200 includes a transmission 202. The transmission 202 is arranged to transmit power from an engine (not shown) to systems that propel or otherwise move the machine. In the illustrative example, the transmission 202 provides power, via a propel power 204 output to one or more systems that operate to move the machine, which is/are shown collectively as a machine propel system 206.

The machine propel system 206 provides a motive force for the machine 100. The propel power 204 output is provided in any suitable form including, for example, mechanical power from a rotating transmission output shaft. The machine propel system 206 includes one or more mechanical drives that are arranged to rotate or otherwise actuate components providing force for driving, for example, one or more wheels of the machine 100.

In the illustrative embodiment, the power delivery system 200 includes a programmed controller 214. The programmed controller 214 is, for example, a single controller or alternatively includes more than one controller disposed to control various functions and/or features of the machine 100. The programmed controller 214, by way of example, includes a gear selection logic module 216 comprising computer-executable instructions that facilitate performing a transmission control strategy described herein. In particular, the gear selection logic module 216 includes a first function that determines a final gear based upon a current determination of power train output torque needed to counter a current resistance to movement of the machine 100 on a traveled surface. By way of example, such resistance is a function of a measured and/or calculated grade that the vehicle is currently attempting to climb and a current vehicle mass. The grade is provided, for example, by an inertial measurement unit. Alternatively, the grade is calculated indirectly from operational parameters indicative of a currently traveled grade. The vehicle mass is determined by any of a variety of methods, including determinations based upon machine characteristics and physics-based calculations (e.g. force=(mass)*(acceleration)).

The gear selection logic module 216 includes a second function for selecting an appropriate downshift control schedule (a series of downshift points) based upon the final gear provided by the first function and a combination of factors including: a throttle position, a load status, a machine acceleration, and a current gear. A throttle position signal is provided, for example, from an operator control device 224 via an operator control signal line 226. Other potential input signals from the operator control device 224 via control signal line 226 include a cruise control signal.

In the illustrated embodiment, the power delivery system 200 includes various links disposed to exchange information and command signals between the programmed controller 214 and the various systems of the machine 100. Such links are of any appropriate type, and may be capable of two-way exchange of multiple signals. In one embodiment, such links are channels of communication between various devices that are connected to one another via a controller area network (CAN). More specifically, a speed sensor link 218 interconnects the programmed controller 214 with a transmission output speed sensor 219. The speed sensor link 218 provides a signal indicative of the output speed of the transmission 202 which, in turn facilitates calculating a variety of other parameter values including machine speed and rate of change of the machine speed for purposes of determining current rate of deceleration of the machine while, for example, climbing a hill.

The set of signals received by the programmed controller 214 includes the following parameters that may be used by the gear selection logic: acceleration (in direction of machine travel), machine incline/slope (estimated or measured), and motor speed (motor RPM).

During operation of the power delivery system 200, the programmed controller 214 may be configured to receive and process information relating to determining torque/force or power utilization by the various systems, for example the machine propel system 206. The programmed controller 214 determines drive force exerted, and power delivered, by the propel power 204 output.

Alternatively, instead of using the transmission output speed, an actual current velocity of the machine 100 may be derived, for example, from a filtered stream/series of instantaneous acceleration signals provided by an accelerometer 240. The filtered acceleration signal specified by the accelerometer 240 may be normalized, when calculating velocity for machine travel on a non-level travel surface, using a signal provided by a slope sensor 242. The slope sensor 242 specifies the grade upon which the machine is traveling (in a forward direction).

The programmed controller 214 is, by way of example, connected to the transmission 202 by two communication links, a transmission output link 228 and a transmission input link 230. The transmission output link 228 represents the ability of the programmed controller 214 to provide command signals to various transmission actuators and systems that control the operation of the transmission 202. Information signals that are indicative of one or more transmission operating parameters are provided to the programmed controller 214 via the transmission input link 230. As discussed above, the transmission input link 230 and the transmission output link 228 are embodied in any appropriate arrangement, for example, by use of CAN links that are capable of transferring more than one signal at the same time, but other arrangements may be used.

It will be appreciated that the programmed controller 214 discussed herein is a computing device, e.g., a programmed processor, which reads computer-executable instructions from a computer-readable medium and executes those instructions. Media that are readable by a computer include both non-transitory and transitory media. Examples of the former include magnetic discs, optical discs, flash memory, RAM, ROM, tapes, cards, etc. Examples of the latter include acoustic signals, electrical signals, AM and FM waves, etc. As used in the appended claims, the term "non-transitory computer-readable medium" denotes tangible media that are readable by a computer unless otherwise specifically noted in the claim.

Figure 3A:
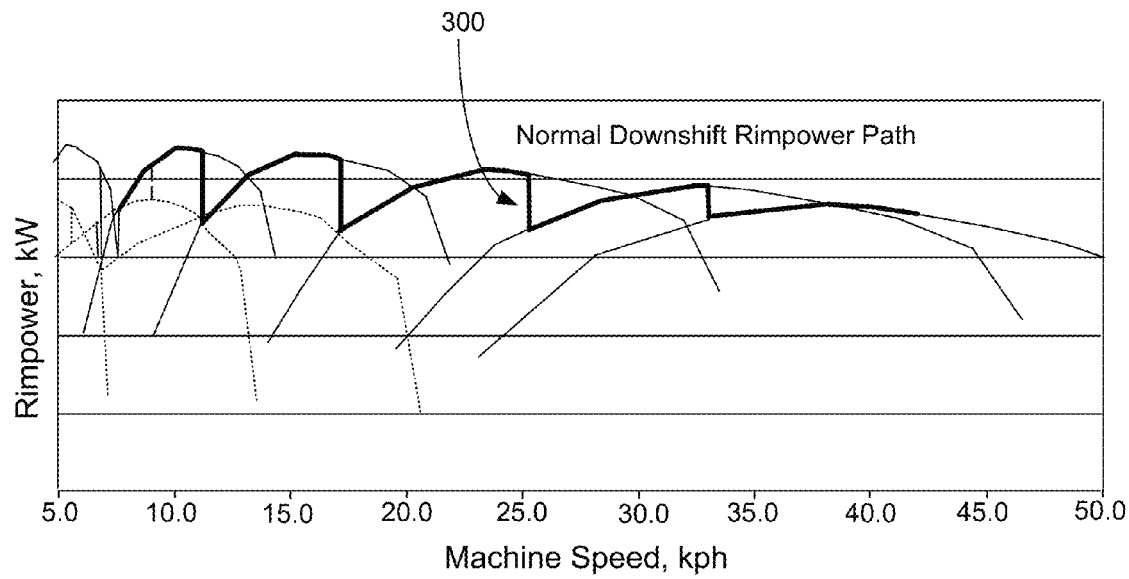
FIG. 3a graphically depicts a set of power curves and operation of a machine traversing a series of gears in a standard manner.
Figure 3B:
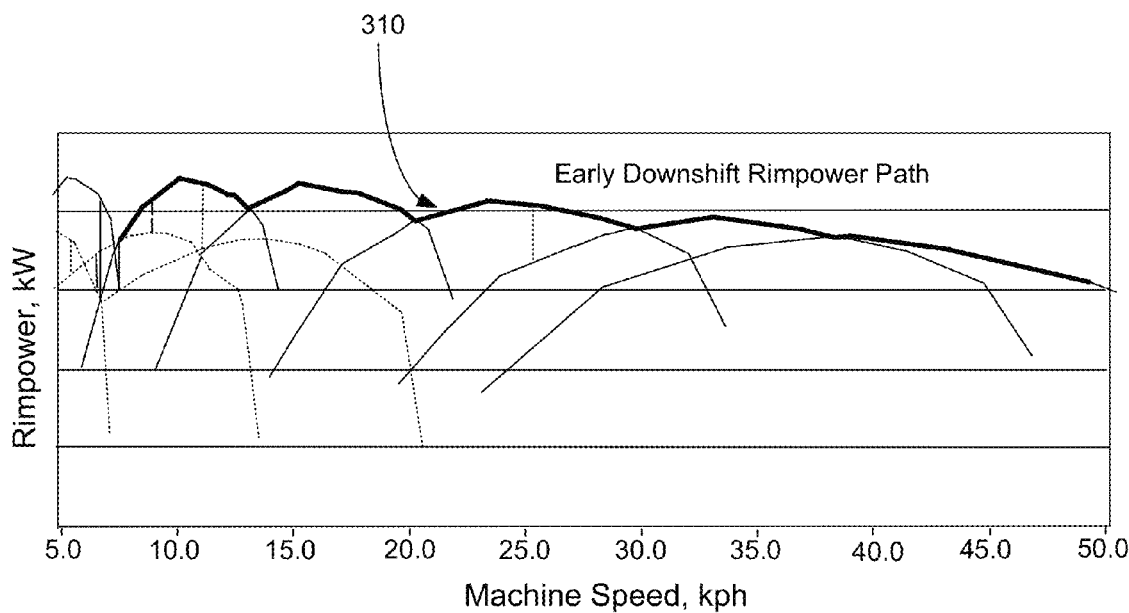
FIG. 3b graphically depicts a set of power curves and operation of a machine traversing a series of gears in accordance with a performance based downshifting scheme for an automatic transmission.

Having described an exemplary machine and power control arrangement (FIG. 2), attention is now directed to FIGS. 3*a* and 3*b* that, together, illustratively depict an exemplary transmission gear selection strategy (FIG. 3*b*). The illustrative strategy maintains engine power at a constantly highest output during deceleration of the machine 100 that, in turn, necessitates performing a series of downshifts to stop the unintended deceleration. Such deceleration is caused, for example, by encountering a high resistance to forward movement due to a combination of factors including the machine attempting to climb a large uphill grade while carrying a large payload or machine tool load (e.g., an engaged grader blade).

In the illustrative example, FIG. 3*a* graphically depicts a typical transmission downshift scheme. In the example, line 300 depicts a rim power path where downshifting is performed as a vehicle decelerates such that a substantial power jump occurs in response to each downshift gear transition.

In contrast to the rim power path of FIG. 3*a*, a rim power path 310 of the machine 100 operating in accordance with a high performance downshift series is depicted in FIG. 3*b* wherein downshifting occurs at crossover points of the power curves for adjacent gears. In the illustrative example of FIG. 3*b*, downshifting occurs relatively earlier for each downshift between adjacent gears for a series of downshifts from fifth gear down to first gear, in comparison to the downshift schedule depicted in FIG. 3*a*. For example, in FIG. 3*a*, downshifting from third to second gear occurs at approximately 17 miles per hour (vehicle speed). At this point, the engine speed (rpm) is sufficiently slowed such that a significant power drop off has occurred while the machine continues to operate in the higher gear. However, in accordance with an early downshift arrangement depicted in FIG. 3*b*, downshifting from third to second gear occurs at a power curve crossover point at approximately 20 miles per hour. Initiating downshifts before power output of the engine has substantially fallen off (e.g., at power curve crossover points between adjacent gears) enables greater total power output by the engine during the series of downshifts from fifth to first gears according to the downshift schedule depicted in FIG. 3b—in comparison to the series of downshifts occurring during the example provided in FIG. 3a. A method, carried out by the gear selection logic module 216, is described herein below with reference to FIG. 4. The method includes identifying circumstances necessitating a series of downshifts from a current gear to a destination gear enabling the transmission 202 to supply sufficient torque to the machine propel system 206, via the propel power 204 output, to counter/overcome a current total resistance force encountered by the transmission 202 of the machine 100.

Figure 4:
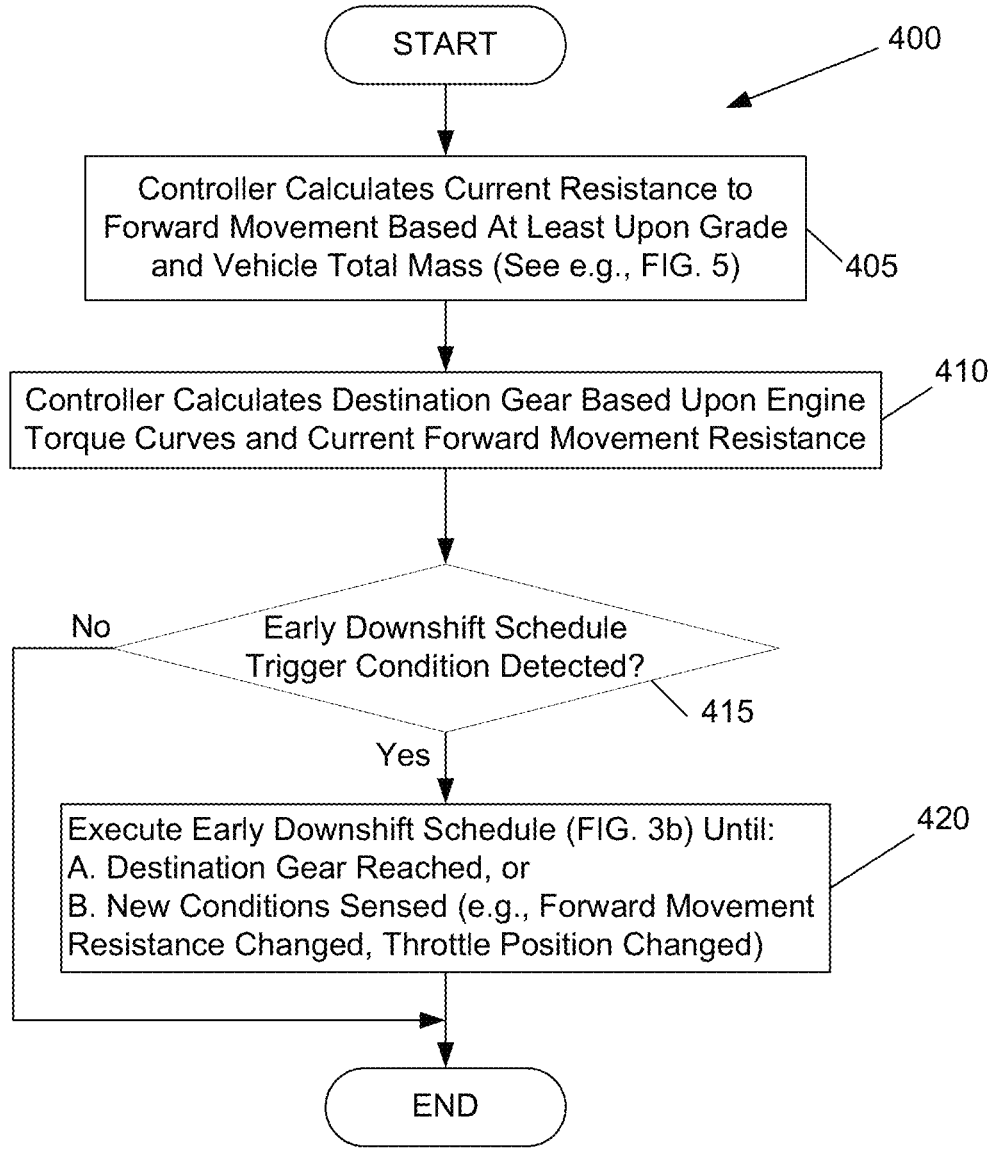
FIG. 4 is a flowchart summarizing operation of an exemplary process carried out by a programmed controller to manage an automatic transmission in accordance with the disclosure.

FIG. 4 summarizes a set of steps for a process 400, repeatedly (e.g., periodically or in response to a triggering event) carried out by the machine 100 under the direction of the programmed controller 214. The summarized steps relate to detecting a triggering event and thereafter implementing a gear shift control strategy in accordance with the downshift arrangement depicted in FIG. 3b to maximize performance (power output) while performing a series of sequentially executed downshifts to a destination gear. The destination gear is determined based upon a current resistance to forward movement encountered by the machine 100. Such resistance is at least based upon a current incline grade and a mass of the machine 100 (including payload). However, such calculation may also incorporate a variety of other contributors to forward movement resistance (described herein below with reference to FIG. 5). The process 400 is exemplary. Thus, variations are contemplated for controlling, based on various observed machine parameters, the triggering of the downshift schedule illustratively depicted in FIG. 3b. The method summarized in FIG. 4 is aided by a payload and grade estimator described herein below with reference to FIG. 5.

During step 405 the programmed controller 214 calculates a current resistance to forward movement of the machine 100. Such calculation is based at least upon a current grade of an incline as well as a current mass of the machine 100 as calculated by the programmed controller 214. A particular example of a configuration of the programmed controller 214 to provide the current mass and grade calculations is provided in FIG. 5 described herein below. In the illustrative example, the forward movement resistance calculation also takes into consideration a resistive force attributed to a machine implement/tool, such as a deployed scraper blade on a grader machine.

During step 410, the programmed controller 214 applies the resistance to forward movement calculated during step 405 to a set of torque characteristics for each of the forward operating gears of the machine 100 to determine a destination gear for the machine 100. By way of example, the destination gear is a highest gear at which sufficient torque is generated, by the transmission 202 and propel power 204 output, to exceed the current forward movement resistance calculated during step 405. Control then passes to step 415.

If, during step 415, the programmed controller 214 detects a trigger condition for activating the early downshift schedule for the machine 100 such as the downshift schedule illustratively depicted in FIG. 3b, then control passes to step 420. By way of example, the trigger condition may comprise any one or more of a set of individual/combined conditions based upon a set of inputs including, for example: throttle position, current gear, rolling resistance, grade, current total vehicle mass, calculated destination gear. For example, in an exemplary embodiment, the early shift schedule unless the calculated destination gear is at least two less than the current gear. Thus, the early shift strategy is intended to be entered when a prolonged substantial torque deficit is likely to be encountered by the machine that requires downshifting to a destination gear in order produce an output torque that exceeds the current resistance force calculated during step 405. If no trigger condition is detected, then control passes from step 415 to the End.

The illustrative control process described herein above with reference to FIG. 4 can be modified and/or enhanced through use of additional and/or alternative sensors.

Figure 5:
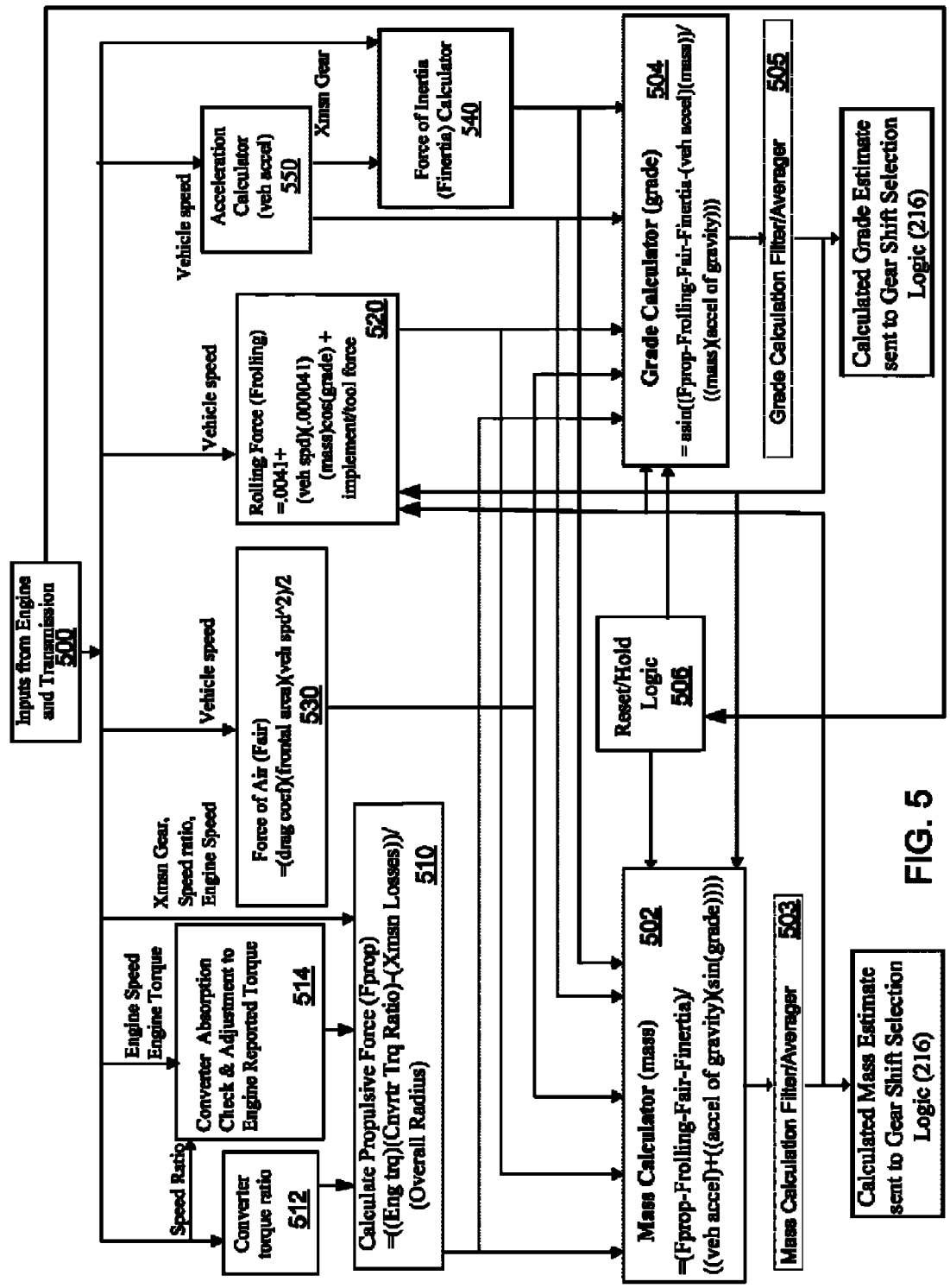
FIG. 5 is a schematic depiction of a set of functional blocks incorporated into a configuration of a programmed processor for performing mass and grade calculations based upon observed forces acting on a vehicle during operation.

Having described an exemplary operation of the programmed controller 214 gear selection logic module 216 to detect and execute an early gear downshift schedule based upon a current forward movement resistance, attention is directed to FIG. 5 summarizing a configuration of the programmed controller 214 that facilitates generating a machine mass and grade (incline) that is used to calculate such force of resistance to forward movement for the machine 100 during step 405 of FIG. 4.

An inputs block 500 represents a set of input parameters used by the programmed controller 214 to perform grade and mass calculations. The input parameters provided by inputs block 500 include, by way of example: a speed ratio, engine speed, engine torque, current transmission gear, and vehicle speed. The input parameters are provided to a set of intermediate calculation blocks (described below) that, in turn, provide their output to a mass calculator 502 and a grade calculator 504. Estimated mass and grade values, generated by the mass calculator 502 and a grade calculator 504, are advantageously provided to the gear selection logic module 216 to control gear selection. While the mass and grade estimates are used in the early downshift strategy discussed herein above (see FIG. 4), the gear selection logic module 216 uses the calculated mass and grade estimates—even in cases where the early gear downshift mode is not activated—to control transmission gear selections to enhance performance and/or fuel economy of the machine 100.

The operation of the mass calculator 502 and the grade calculator 504 is performed iteratively and in parallel. The mass calculator 502 generates a mass estimate M according to the equation:

$$M=(F\text{prop}-F\text{rolling}-F\text{air}-F\text{inertia})/((\text{veh acceleration})+((\text{accel of gravity})(\sin(\text{grade}))))$$

The grade calculator 504 generates a grade estimate G according to the equation:

$$G=a\sin((F\text{prop}-F\text{rolling}-F\text{air}-F\text{inertia}-(\text{veh accel})(\text{mass}))/((\text{mass})(\text{accel of gravity})))$$

Moreover, the mass and grade calculations are co-dependent. Thus, the output values of the mass calculator 502 are passed to the grade calculator 504 to facilitate grade calculations, and the output values of the grade calculator 504 are passed to the mass calculator 502 to facilitate mass calculations. The iterative sharing of mass and grade estimate calculations by the mass calculator 502 and grade calculator 504 creates a self-correcting co-dependent relationship between the mass calculator 502 and the grade calculator 504 that avoids the necessity to implement error correction algorithms such as the recursive least squares algorithm described, for example, by Kresse U.S. Pat. No. 7,499,784.

As explicitly depicted in FIG. 5, a mass calculation filter/averager 503 and a grade calculation filter/averager 505 may be implemented on input and/or output values for the mass calculator 502 and grade calculator 504 to provide a degree of temporal stability to mass and grade calculations in the short term. As will be appreciated in view of the illustrative embodiments, the filter/averager functionality can be implemented in a variety of ways using any of a variety of filtering/averaging schemes. By way of example, a weighted moving average window, specifying a sequence of x coefficients (weights) totaling a value of 1, is applied to a sequence of previously calculated values including: (1) a current value rendered by the mass calculator 502 or grade calculator 504, as well as (2) x−1 previously calculated values rendered by the mass calculation filter/average 503 or grade calculation average 505.

Moreover, multiple filter/averager definitions can be provided. First, distinct filter/averager definitions are provided for processing the output of the mass calculation filter/average 503 and the grade calculation filter/averager 505. Second, multiple distinct filter/averager definitions are provided, and dynamically specified, based upon an current general operation state of the machine. Such states include, for example, a starting/accelerating from a stopped state, a gear shift, a steady rolling state. In such distinct operational states, different sets of coefficients are used to resist or accept current changes to calculated mass and grade values rendered by the mass calculator 503 and grade calculator 505. Other tunable aspects of the filter/averager definitions include the time delay between calculations of new mass and grade values and the number of total values (x) falling within the averaging window (in the illustrative example).

The description below is directed to the sources of parameter values (see FIG. 5) for the above identified parameters used by the mass calculator 502 and the grade calculator 504. A propulsive force calculator 510 provides the Fprop parameter value, the force generated at the output of the transmission, based upon the following equation:

$$F_{prop}=((Eng\ trq)(Cnvrtr\ Trq\ Ratio)-(Xmsn\ Losses))/(Overall\ Radius)$$

The Engine Torque (Eng trq) parameter value is based upon a reported engine torque value provided to a converter absorption block 514 from the inputs block 500. The actual torque delivered at the transmission output is provided by the converter absorption block 514 based upon a set of provided parameters that impact the operation of the torque converter. In particular, the converter absorption block 514 determines whether the converter is in lock-up or converter mode. When the torque converter is operation in lock-up mode, converter absorption block 514 passes the reported engine torque (from the inputs block 500) to the propulsive force calculator 510 in its unmodified form (i.e., the engine torque value provided by the inputs block 500). However, if the torque converter is operating in the "converter" mode, the converter absorption block 514 adjusts (reduces) the reported engine torque value received from the inputs block 500 according to a conversion table/equation based upon current machine operating parameter values including: reported engine torque (from inputs block 500), speed ratio (ratio of torque converter input to converter output), and engine speed (from inputs block 500).

The Converter Torque Ratio (Cnvrtr Trq Ratio) is provided by a converter torque ratio block 512 based upon a speed ratio parameter value provided by the inputs block 500 based upon the converter input speed and converter output speed. The Transmission Losses (Xmsn Losses) parameter value accounts for force losses attributable to rotation/movement of the transmission components. The transmission losses force value is dynamically generated by the propulsive force calculator 510 based upon speed ratio, engine speed and transmission gear parameter values provided by the inputs block 500.

The Overall Radius parameter value corresponds to the rolling radius of a driven wheel on a driven surface (e.g., the distance from the center of the driven wheel to the ground)

Having described the functionality of the propulsive force calculator 510, attention is directed to a set of additional functional blocks that provide input parameter values to the mass calculator 502 and the grade calculator 504. A Rolling Force calculator 520 provides the Roll Force parameter value, the rolling resistance caused by a surface upon which the vehicle's wheels are travelling, based upon the following equation:

$$Roll\ Force(Frolling)=0.0041+(vehicle\ speed)(0.000041)(mass)cos(grade)+(implement/tool\ force)$$

The Rolling Force calculator 520 receives input mass and grade values from the mass calculator 502 and the grade calculator 504, and receives the vehicle speed from the inputs block 500. The Rolling Force calculator 520 is intended to be a customizable block wherein a constant and/or coefficient (e.g., 0.0041 and 0.000041) can be modified in either the short term (e.g., when an implement such as a grader blade is deployed) or long term (working on soft soil, travelling on a road, etc.).

Moreover, the Rolling Force calculator 520 is configured to account for forces attributable to a tool/implement that is deployed in a manner that either aids/resists movement of the machine to which it is attached (e.g., the tool is engaged with the ground). In the case of the motor grader 101, a sensor (e.g., pressure transducer) provides a signal representative of an implement (e.g., blade 110) resistance force. The implement resistance force is represented by the "implement/tool force" term in the above provided Roll Force equation. The signal representative of the implement resistance force may be filtered to smooth the signal over the short term and reject/minimize transient sensor spikes that should not substantially affect long-term rolling resistance calculations performed by the Rolling Force calculator 520.

A Force of Air calculator 530 provides the Air Force parameter value, the resistance created by drag as a vehicle moves through air, based upon the following equation:

$$Air\ Force=(drag\ coefficient)(frontal\ area)(vehicle\ speed^2)/2$$

The Force of Air calculator 530 receives an input vehicle speed value from the inputs block 500. The frontal area is provided based upon previous measurements, and the drag coefficient is provided from previous measurements for the type of the machine 100 under various conditions.

A Force of Inertia calculator 540 provides the Inertia Force parameter value, the force needed to accelerate the transmission and other drive train components of the machine 100, based upon a current vehicle acceleration (i.e., change in linear speed per time unit) and a current transmission gear. The current transmission gear is provided by the inputs block 500. The vehicle acceleration is provided by an acceleration calculator 550 based upon a series of input vehicle speeds over specified time periods. It is particularly noted that the transmission gear input parameter value (indicating the current gear of the machine) may be very important to accurate calculations by both the mass calculator 502 and the grade calculator 504 in machines where the inertial forces vary widely according to selected gear due to their substantial mass.

Having described the input values and calculations performed by an exemplary configuration of the programmed controller 214, it is further noted that in some instances it is beneficial to freeze or even reset calculations by the mass calculator 502 and the grade calculator 504. In the illustrative example provided in FIG. 5, a reset/hold logic block 506 guards against potentially unusual input parameter values that may lead to undesirable erratic behavior by the gear selection logic module 216. In particular, the reset/hold logic block 506 receives input values from the inputs block 500 indicative of current operating conditions for the machine 100 that call for either resetting or holding values previously calculated by the mass calculator 502 and/or the grade calculator 504. Based upon the received input values from inputs block 500 the reset/hold logic block 506 conditionally issues freeze or reset signals to one or both of the mass calculator 502 and the grade calculator 504. For example, the mass value generated by the mass calculator 502 is reset to the empty load value, when the machine 100 is an articulated truck, when a load ejector button is activated. Also, the reset/hold logic block 506 issues a signal freezing operation of both the mass calculator 502 and the grade calculator 504 any time the machine 100 is turning due to the complex forces acting upon the machine 100 such operation.

INDUSTRIAL APPLICABILITY

The present disclosure is applicable to driven machines having an automatic transmission controlled and configured to deliver a variable propulsive force to drive wheels of a machine. In particular, the disclosed principles provide a mechanism for maintaining engine power output at a higher level during a series of downshifts necessitated by the machine encountering an increased resistance to forward movement of the machine as a result of, for example, encountering a hill having a relatively steep grade. This system may be implemented in a variety of machines that operate under a variety of propulsive load conditions and are likely to experience substantially increased forward movement resistance during normal operation. Although many machines that may benefit from the disclosed principles will be machines used in off-road machines such as graders and off-road articulated dump trucks/haulers, it will be appreciated that the disclosed machines and programmed controller process for such machines are used in other contexts as well, and the teachings are likewise broadly applicable.

Using the disclosed principles, the programmed controller 214 controls a transmission to ensure that the propulsion system operates at a high power output wherein gear downshifts occur, during deceleration of the machine, at the power curve cross-over points for adjacent gears. It will be appreciated that this description provides examples of the disclosed system and technique. However, it is contemplated that other implementations of the disclosure may differ in detail from the foregoing examples. Moreover, the references to examples herein are intended to reference the particular example being discussed at that point and are not intended to imply any limitation as to the scope of the disclosure more generally. All language of distinction and disparagement with respect to various features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order and from any suitable step unless otherwise indicated herein or otherwise clearly contradicted by context.

What is claimed is:

1. A vehicle including:
   an automatic transmission;
   a set of sensor inputs providing values indicating a current operational status of the vehicle and pertinent to controlling the automatic transmission, the set of sensor inputs including:
   engine speed;
   engine torque;
   current transmission gear; and
   vehicle speed; and
   a programmed controller configured by computer-executable instructions to iteratively and co-dependently generate both a vehicle mass parameter value and a grade of incline parameter value, the programmed controller using a set of parameters including:
   a propulsive force driving the vehicle;
   a set of forces acting on the vehicle resisting forward movement, and
   an observed rate of change of a speed of the vehicle,
   wherein co-dependently generating both the vehicle mass parameter value and the grade of incline parameter value comprises using a previously generated vehicle mass parameter value to generate a current incline parameter value, and using a previously generated incline parameter value to generate a current vehicle mass parameter.

2. The vehicle of claim 1 wherein a mass calculator of the programmed controller carries out generating the vehicle mass parameter value, and wherein the programmed controller is further configured to include a reset/hold logic functionality that selectively issues a command to the mass calculator to reset a current value for the vehicle mass parameter value during a period of mechanical instability.

3. The vehicle of claim 2 wherein the period of mechanical instability arises from a turning operation of the vehicle.

4. The vehicle of claim 2 wherein the period of mechanical instability arises from a dumping operation by the vehicle.

5. The vehicle of claim 1 wherein the set of forces acting on the vehicle resisting forward movement include an actuable implement/tool force.

6. The vehicle of claim 1 wherein the set of forces acting on the vehicle resisting forward movement include a force of inertia arising from a transmission, and wherein a value for the force of inertia is determined at least in part by a currently selected operating gear of the vehicle.

7. The vehicle of claim 1 wherein the set of forces acting on the vehicle resisting forward movement include a traveled surface-dependent force.

8. The vehicle of claim 1 wherein the set of forces acting on the vehicle resisting forward movement include a speed-dependent air resistance force.

9. The vehicle of claim 1 wherein the programmed controller is further configured to select a shift control schedule based upon the generated vehicle mass parameter value and the grade of incline parameter value.

10. The vehicle of claim 1 wherein the grade of incline is rendered by a grade calculator based upon a set of forces operating upon the vehicle, the mass resulting in linear acceleration of the vehicle.

11. The vehicle of claim 1 wherein the grade of incline is rendered from a direct measure of current grade.

12. The vehicle of claim 1 wherein the programmed controller includes a filter/average for rendering a filtered/averaged output value for at least one of the group consisting of: the vehicle mass parameter value and the grade of incline parameter value.

13. A method, performed by a programmed controller configured by computer-executable instructions, for providing a vehicle parameter value pertinent to control of an automatic transmission within a vehicle including an automatic transmission, the vehicle generating a set of sensor inputs providing values indicating a current operational status of the vehicle and pertinent to controlling the automatic transmission, and wherein the set of sensor inputs include: engine speed, engine torque, current transmission gear; and vehicle speed, the method comprising:
iteratively and co-dependently performing, by the programmed controller, the steps of:
generating a current vehicle mass parameter value based upon a previously generated grade of incline parameter value, and
generating a current grade of incline parameter value based upon a previously generated vehicle mass parameter value,
wherein, in addition to the previously generated grade of incline parameter value, the generating the vehicle mass parameter is based upon a set of parameters including:
a propulsive force driving the vehicle,
a set of forces acting on the vehicle resisting forward movement, and
an observed rate of change of a speed of the vehicle; and
issuing, by the programmed controller, an output signal to the automatic transmission, the output signal being based upon at least one of the current vehicle mass parameter value and the current grade of incline parameter value.

14. The method of claim 13 further comprising:
issuing a command to reset a current value for the vehicle mass parameter value during a period of mechanical instability.

15. The method of claim 14 wherein the period of mechanical instability arises from a dumping operation by the vehicle.

16. The method of claim 14 wherein the period of mechanical instability arises from a turning operation of the vehicle.

* * * * *